United States Patent [19]

Ristau

[11] 3,718,326
[45] Feb. 27, 1973

[54] TORSIONS IMPACT ENERGY ABSORBING DEVICE

[75] Inventor: Theodore F. Ristau, Saginaw, Mich.

[73] Assignee: General Motors Corporation, Detroit, Mich.

[22] Filed: July 26, 1971

[21] Appl. No.: 165,513

[52] U.S. Cl. ............267/140, 114/219, 188/129, 267/154, 293/85, 293/89
[51] Int. Cl. ............B60r 19/08, F16f 7/02, F16f 7/12
[58] Field of Search ........114/219; 188/129; 267/140, 267/154; 293/70, 85, 89

[56] References Cited

UNITED STATES PATENTS

| | | | |
|---|---|---|---|
| 3,390,546 | 7/1968 | Jewell | 267/154 |
| 3,369,634 | 2/1968 | Mazelsky | 293/70 X |
| 3,635,314 | 1/1972 | Mazelsky | 293/70 X |

Primary Examiner—Drayton E. Hoffman
Assistant Examiner—Howard Beltran
Attorney—W. E. Finken et al.

[57] ABSTRACT

An impact energy absorbing device includes a pair of tubular members arranged for telescopic movement relative one another upon application of impact force thereto, a third tubular member attached to one of the pair of tubular members by annular elastomeric bushings press-fitted in radial compression between the walls of the respective tubular members, and a rotary motion producing mechanism in connection between the third tubular member and the other of the pair of tubular members to convert axial telescopic movement of the pair of tubular members into rotary movement of the third tubular member causing torsional energy storing as well as energy dissipating wind-up of the elastomeric bushings. Relief of the impact force permits the energy stored in the wound-up elastomeric bushings to restore the tubular members to their pre-impact relative positions in readiness for subsequent impacting.

4 Claims, 5 Drawing Figures

INVENTOR.
Theodore F. Ristau
BY
D. L. Ellis
ATTORNEY

INVENTOR.
Theodore F. Ristau
BY
O. L. Ellis
ATTORNEY

TORSIONS IMPACT ENERGY ABSORBING DEVICE

The invention relates to an improved energy absorbing device and more particularly to an impact energy absorbing device which is self-restored to the operative condition subsequent to impact absorption.

It is advantageous in automotive vehicle collapsible steering column assemblies and bumper mounts, and in diverse other applications, to provide a mechanism capable of absorbing kinetic energy. Furthermore, it is desirable, at least in the event of impacts up to a predetermined level, to provide an energy absorbing device which, subsequent to impacting, restores itself to its pre-impact condition so that it may repeat its energy-absorbing function upon subsequent impacts.

The present invention features an impact energy absorbing device which is self-restored to the pre-impact condition in readiness for subsequent impacts. The invention includes a pair of tubular members which are rotationally stationary relative one another and are arranged for telescopic movement relative one another upon application of impact force thereto. A third tubular member is attached to one of the pair of tubular members by press-fitting annular elastomeric bushings between the walls thereof. A rotary motion producing mechanism is provided in connection between the third tubular member and the other of the pair of tubular members to convert axial telescopic movement of the pair of tubular members into rotary movement of the third tubular member. Forced rotation of the third tubular member causes energy storing elastic deformation or winding up of the annular elastomeric bushings and simultaneous kinetic energy dissipation by virtue of internal viscous flow of the viscoelastic bushing material. When the impact force is relieved, the energy stored in the wound-up elastomeric bushings rotates the third tubular member to its original rotary position and acts through the rotary motion producing mechanism connecting the third tubular member and the other of the pair of members to impart retrograde telescopic movement to the pair of tubular members, thus restoring the energy absorbing device to the pre-impact condition in readiness for the next impact.

In one embodiment of the invention hardened balls seated in helical grooves formed on both the third tubular member and the other of the pair of tubular members function to impart rotary movement to the third tubular member when the pair of tubular members are telescoped by the impact force. In another embodiment of the invention a cam roller and ramp arrangement acts between the third member and the other of the pair of members to produce the rotary movement of the third tubular member. An axial spline may be provided in the energy absorbing device to prevent relative rotary motion between the pair of telescoping tubes, or alternately the pair of tubular members may be fixedly attached to relative rotationally stationary bodies to which the impact force is applied.

These and other features of the invention will be readily apparent from the following specification and from the drawings in which.

Figure 1:
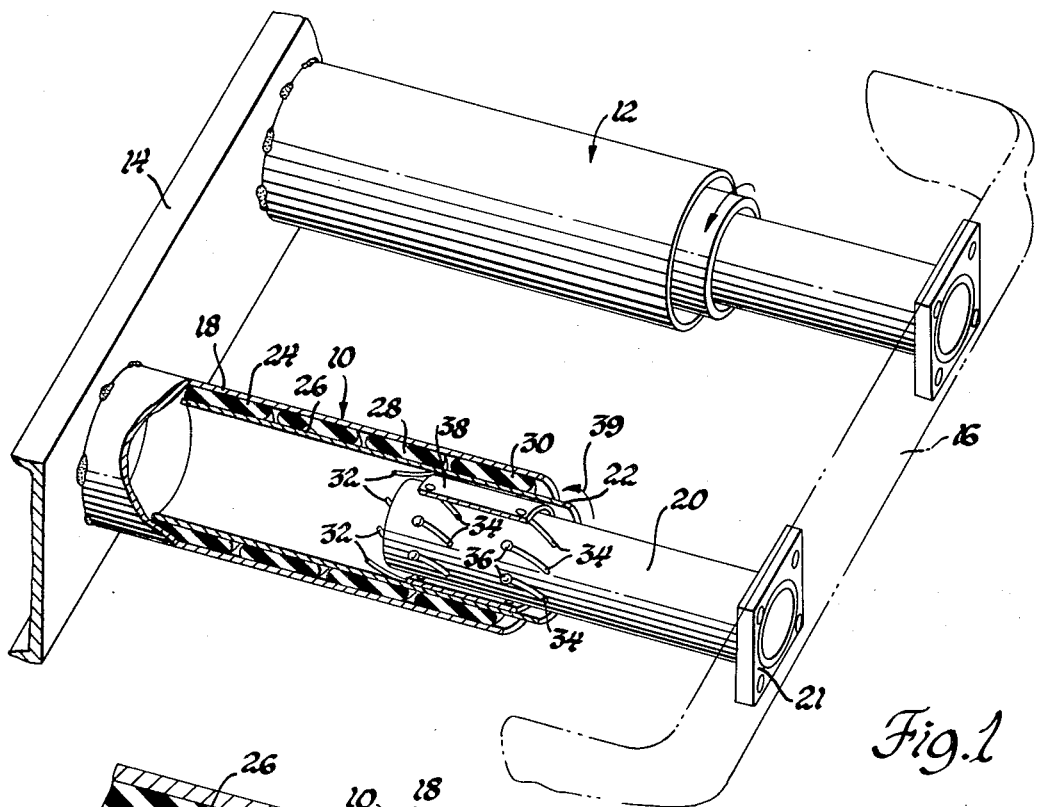
FIG. 1 is a perspective view having parts broken away and in section showing a pair of energy absorbing devices embodying the invention and arranged in connection between a vehicle frame member and a bumper assembly.

Referring to FIG. 1, the invention is shown arranged for use within an energy absorbing bumper assembly, a use for which the invention is particularly well suited, although by no means limited. A pair of energy absorbing devices, generally indicated at 10 and 12, are constructed according to the invention and mount a bumper or impact bar 16 to a vehicle frame member 14. The energy absorbers 10 and 12 are laterally spaced either side of the longitudinal centerline of the vehicle, providing dual bumper mounts and holding the bumper 16 rotationally stationary relative the frame member 14. The energy absorber 10, the following description of which will be understood as applying identically to energy absorber 12, includes a tubular member 18 suitably connected to frame member 14 as by welding, a tubular member 20 connected to the bumper 16 as via a rigidly attached flange 21 bolted to the bumper, and a tubular member 22. The tubular members are arranged generally concentrically with tube 20 extending inside tubular member 22 and tubular member 22 in turn extending inside tubular member 18. Annular elastomeric bushings 24, 26, 28 and 30 have an interference fit within the annular space between tubular members 18 and 22, i.e., the undeformed thickness of the bushings is predeterminedly larger than the annular space. This interference fit may be varied for best results by experimentation for the purposes set forth hereinafter. The resulting radial compression of the elastomeric bushings causes the outer peripheral and inner peripheral surfaces of the bushings to respectively frictionally engage the tubular member 18 and the tubular member 22 to such an extent that the tubular members will not move substantially axially relative one another and can move rotationally relative one another only by energy absorbing deformation of the elastomeric bushings.

Figure 2:
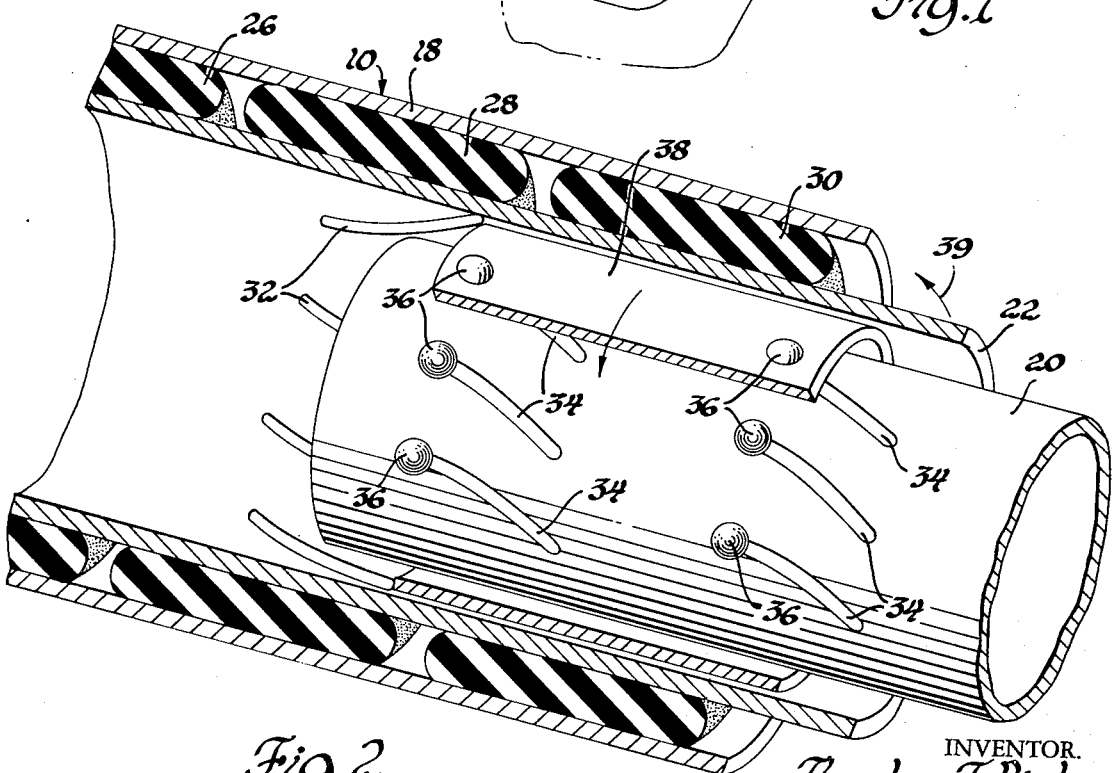
FIG. 2 is an enlarged view of a portion of FIG. 1.

Referring to the enlarged view of FIG. 2, a plurality of circumferentially spaced helical grooves 32 are formed on the inner peripheral surface of tubular member 22, and helical grooves 34 corresponding to grooves 32 and of the same hand are formed on the outer peripheral surface of tubular member 20. The grooves 32 and 34 are shown to be of equal helix lead and of equal circumferential spacing, although the leads of the respective sets of grooves may be varied. A plurality of balls 36 are press-fitted between the tubular members 20 and 22 and ride in the grooves 34 and 32 formed respectively thereon. Each of the balls 36 are captured in an aperture of a ball retaining sleeve 38 having a wall thickness less than the diameter of balls 36. It is noted that it is advantageous to arrange the helical grooves and balls in at least two axially spaced rows as shown in FIG. 2 to insure smooth telescopic movement of tubular member 20 when side impact loads tend to bend the energy absorber 10.

The helical grooves 32 and 34 may be simply and economically formed on the tubular members 20 and 22 in the following manner. The balls 36 are press-fitted in the apertures of ball retaining sleeve 38. The ends of tubular members 20 and 22 are chamfered to facilitate the starting of balls 36 into the annulus between the tubular members, the annulus being predeterminedly smaller than the diameter of the balls. One of the tubular members is forcibly telescoped into and rotated relative the other which is held stationary, causing the balls 36 to roll between the tubular members and brinell the helical grooves 32 and 34 respectively thereon. The helix lead is of course determined by the relative rates of telescopic and rotational movement of the tubular members. The tubular members may then be pulled axially apart and the balls 36 will ride in the grooves causing the tubular members to rotate relative one another. It is noted that while the pressfitting of the balls into the annulus between the tubes leaves a residual stress in the tubular members which results in some energy dissipation when the tubular members are telescoped relative one another, this energy dissipation is preferably small in comparison with the magnitude of energy dissipated by wind-up of the elastomeric bushings as will be described hereinafter.

The energy absorbing bumper assembly is shown in FIGS. 1 and 2 in the unimpacted condition wherein the energy absorbers 10 and 12 hold the bumper 16 in axial spaced relation from the frame member 14. In operation, when the bumper 16 collides with a resisting object, the energy absorbers 10 and 12 are loaded in compression by the axial impact force, causing the tubular member 20 to telescope into tubular members 18 and 22. This telescoping movement acts on the balls 36 in helical grooves 32 and 34 so that the balls in turn cause tubular member 22 to be rotated in the direction of arrows 39 relative the rotationally fixed tubular members 18 and 20. Rotation of tubular member 22 causes the annular elastomeric bushings 24, 26, 28 and 30 to be wound-up or torsionally elastically deformed to the extent that the rotational displacement energy imparted to tubular member 22 is sufficient to overcome the natural resistance of the bushings to such deflection.

By proper selection of the material of the bushings, and of the initial interference fit thereof between the tubular members, the bushings are capable of a great deal of energy dissipation. For example, the viscoelastic behavior of natural rubber is quite sufficient for irreversible absorption of a large percentage of the rotational energy applied to tubular member 22. The dynamic loading of the energy absorbing device by the kinetic impact energy and the consequent deformation of the bushings results in a large amount of viscous flow in the body of the bushings. This viscous flow is irreversible and results in energy dissipation. The amount of energy not so dissipated is of course retained in the bushings as elastic deformation potential energy useful for return of the energy absorbing bumper assembly to its pre-impact position. The relative proportions of dissipated versus stored energy may be varied by selection of the elastomeric material and furthermore is dependent on the dynamic loading encountered in a particular impact.

Thus, when the impact force is relieved from frame member 14 and bumper 16, the energy absorbing devices 10 and 12 restore the bumper 16 to its pre-impact spaced relation from frame member 14 in readiness for subsequent impacting. The elastic potential energy stored in elastomeric bushings 24, 26, 28 and 30 urges the tubular member 22 to rotate to its pre-impact rotary position wherein the elastomeric bushings are undeformed. The torque imparted to tubular member 22 by the unwinding of the elastomeric bushings is translated into an axial thrust by the cooperation of balls 36 with helical grooves 32 and 34 to impart retrograde telescopic movement to the tubular member 20 and thereby, with the assistance of identical action in energy absorber 12, return the bumper 16 to its pre-impact spaced relation from frame member 14.

Figure 3:
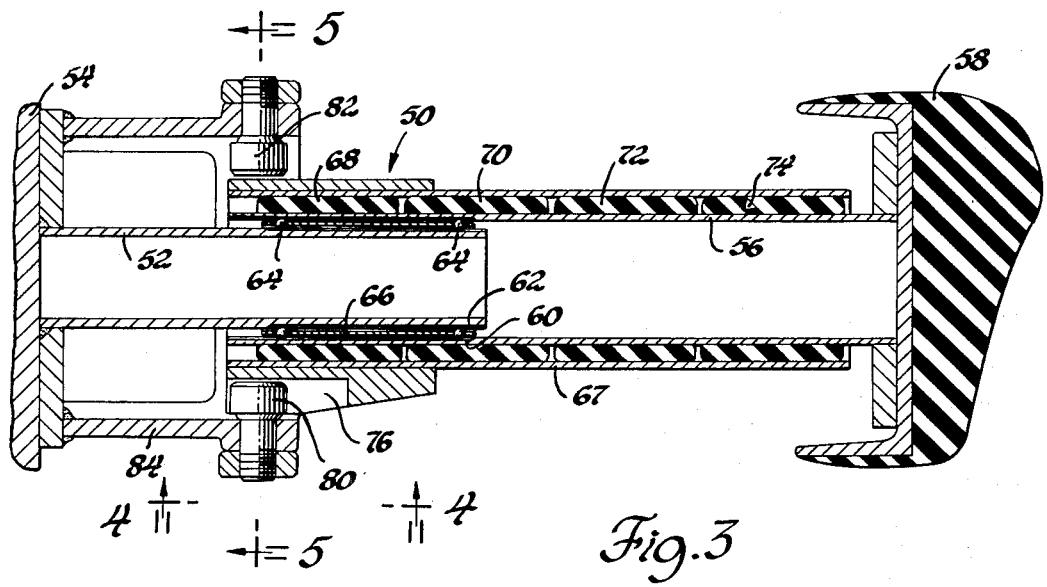
FIG. 3 is a longitudinal section view of a second embodiment of the invention.

Referring to FIG. 3, an energy absorbing device indicated generally at 50 embodies a second form of the invention. The energy absorber 50 includes a tubular member 52 connected to the frame member 54 and a tubular member 56 connected to a bumper 58. Tubular member 56 is telescopically movable relative to tubular member 52 and is located concentrically thereto. A plurality of equally circumferentially spaced axially extending grooves 60 are formed on the inner peripheral surface of tubular member 56, and an equal number of mating axially extending grooves 62 are formed on the outer peripheral surface of tubular member 52. A plurality of balls 64 are press-fitted between tubular members 52 and 56 and ride in the grooves 62 and 60 formed respectively thereon. The balls 64 are held in two axially spaced annular rows by a ball retaining sleeve 66 which captures the balls 64 in axially spaced apertures formed therein. The grooves 60 and 62 may be formed by starting the balls 64 into the annulus between the tubular members 52 and 56 and then telescoping the tubular members relative one another causing the balls to roll and brinell the axial grooves into the tubular members. During telescopic movement between tubular members 52 and 56, the balls 64 ride in grooves 60 and 62 maintaining axial alignment of the tubular members when subjected to side impact loads and also preventing relative rotation between the tubular members 52 and 56.

Figure 4:
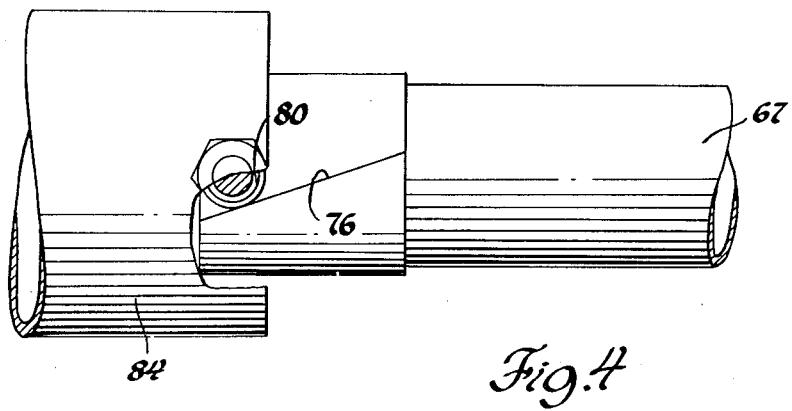
FIG. 4 is an elevational view taken along the plane indicated by lines 4—4 of FIG. 3.
Figure 5:
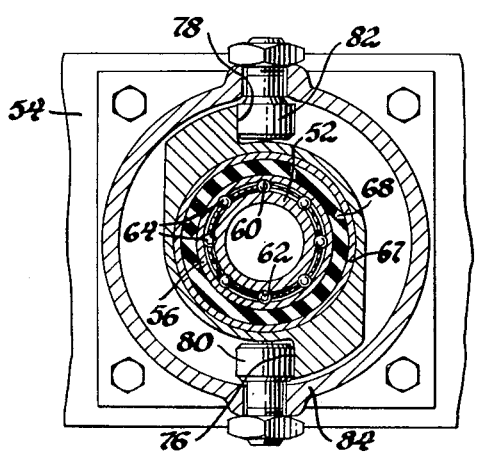
FIG. 5 is a cross-section view taken along the plane indicated by lines 5—5 of FIG. 3.

A third tubular member 67 is arranged concentrically with tubular member 56. Annular elastomeric bushings 68, 70, 72 and 74 are press-fitted into the annular space between tubular members 56 and 67. A pair of radially raised cam surfaces 76 and 78 are carried by tubular member 67 at diametrically opposed points. A pair of cam rollers 80 and 82 are bolted at diametrically opposed points to a tubular member 84 which is fixedly attached relative tubular member 52. The cam rollers 80 and 82 respectively coact with the cam surfaces 76 and 78 to establish the relative rotary and axial rest positions between the respective tubular members as shown in FIGS. 3, 4 and 5.

When the bumper 58 is impacted against a resisting object, the energy absorber 50 is loaded in compression by a generally axially acting force which causes tubular member 56 to move telescopically relative tubular member 52. Axial movement of tubular member 56 is permitted only by virtue of ramp surfaces 76 and 78 respectively riding over cam rollers 80 and 82 and consequently forcibly rotating tubular member 67 relative the tubular members 52 and 56. The axial spline formed by balls 64 riding in grooves 60 and 62 prevents rotation between the tubular members 52 and 56 and also dissipates some small amount of energy in overcoming the residual stress resulting from press-fitting balls 54 between the tubular members 52 and 56. Rotation of tubular member 67 causes energy storing and dissipating torsional elastic deformation or winding up of the annular elastomeric bushings 68, 70, 72 and 74.

Relief of the impact force from the frame member 54 and bumper 58 permit retrograde axial telescoping movement between tubular members 52 and 56. As the impact force is relieved, the elastomeric bushings 68, 70, 72 and 74 impart to tubular member 67 a torque which acts through the engagement of cam rollers 80 and 82 with ramp surfaces 76 and 78 to restore tubular member 67 to its rest rotary position and simultaneously move tubular members 67 and 56 axially to their axial rest position.

It is noted that the energy absorbing device 10 of FIG. 1 is limited to applications wherein the tubular members 18 and 20 may be fixed to bodies which are rotationally stationary relative one another while the energy absorber 50 of FIG. 3 includes an integral anti-rotation device in the form of an axial spline including the balls 64 and grooves 60 and 62 which prevents rotary movement between tubular members 52 and 56. Thus, energy absorber 50 is not limited to applications wherein the tubular members 52 and 56 must be non-rotatably attached to rotationally stationary bodies.

It is apparent from the foregoing discussion that the energy absorbing capacity of a device embodying the invention may be varied to suit particular applications by the selection of appropriate parameters for such variables as the number and viscoelastic characteristics of the annular elastomeric members, the angle and length of the cam surfaces 76 and 78, or the lead and length of the helix grooves 32 and 34. It is thus apparent that energy absorbing devices embodying the invention may be adapted for use in diverse applications.

What is claimed is:

1. A self-restoring device for absorbing the kinetic energy of impact and comprising:
    a pair of coaxially aligned members telescopeable relative one another upon application of impact force thereto;
    means preventing relative rotary movement between the pair of members;
    a third member aligned coaxially with the pair of members;
    elastomeric means radially compressed between the third member and one of the pair of members;
    and rotary motion producing means in connection between the third member and the other of the pair of members acting to impart rotary motion to the third member upon telescopic relative movement between the pair of members whereby the elastomeric means is torsionally deformed to dissipate energy by viscous flow in the elastomeric means and to store energy therein to subsequently effect return of the pair of members to their pre-impact axial relation.

2. A self-restoring device for absorbing the kinetic energy of impact and comprising:
    a pair of coaxially aligned members arranged for telescopic movement relative one another upon application of impact force thereto;
    means preventing relative rotary movement between the pair of members;
    a third member aligned coaxially with the pair of members;
    annular elastomeric means radially compressed between the third member and one of the pair of members;
    helical grooves formed on adjacent peripheral surfaces of the third member and the other of the pair of members;
    at least one rolling body riding in the helical grooves to impart rotary motion to the third member upon telescopic relative movement between the pair of members whereby torque is applied to the third member causing torsional deformation of the annular elastomeric means and consequent energy dissipating viscous flow thereof and elastic energy storage therein, the stored energy being effective to subsequently return the third member to the pre-impact rotary position thereof and thereby impart retrograde telescopic movement to the pair of members.

3. A self-restoring device for absorbing the kinetic energy of impact between a pair of axially spaced rotationally stationary bodies comprising:
    a first tubular member non-rotatably attached to one of the bodies;
    a second tubular member non-rotatably attached to the other of the bodies, coaxially aligned with the first tubular member and telescopeable with the first tubular member upon application of generally axially directed impact force thereto;
    a third tubular member interposed radially intermediate the first and second tubular members;
    annular elastomeric means radially compressed between the first and third tubular members;
    a plurality of helical grooves formed correspondingly on adjacent peripheral surfaces of the second and third tubular members;
    and a plurality of balls fitted between the second and third tubular members and riding in the helical grooves to impart rotary motion to the third tubular member upon telescoping movement between the first and second tubular members whereby torque is applied to the third tubular member causing energy absorbing torsional deformation of the annular elastomeric means, dissipating energy by viscous flow therein and storing elastic energy therein effective to subsequently return the third tubular member to the pre-impact rotary position thereof, thereby imparting retrograde telescopic relative movement to the first and second tubular members to restore the pair of bodies to their pre-impact axial spaced relation.

4. A self-restoring device for absorbing the kinetic energy of the impact and comprising:
    a pair of coaxially aligned members arranged to telescope relative one another upon application of impact force thereto;
    means preventing relative rotary movement between the pair of members;
    a third member aligned coaxially with the pair of members;
    annular elastomeric means radially compressed in interference fit between the third member and one of the pair of members;
    and rotary motion producing means including a cam means and a ramp surface acting between the third member and the other of the pair of members to impart rotary motion to the third member when the pair of members are telescoped axially together whereby impact energy is dissipated by viscous flow in the elastomeric body and elastically stored therein to subsequently effect return of the third member to the pre-impact rotary relation and return the pair of members to their pre-impact relative axial positions.

* * * * *